US012580105B2

(12) United States Patent
Kawajiri et al.

(10) Patent No.: US 12,580,105 B2
(45) Date of Patent: Mar. 17, 2026

(54) MULTILAYER VARISTOR AND METHOD FOR MANUFACTURING THE SAME

(71) Applicant: Panasonic Intellectual Property Management Co., Ltd., Osaka (JP)

(72) Inventors: Keiji Kawajiri, Hokkaido (JP); Naoki Mutou, Hokkaido (JP); Hironori Motomitsu, Osaka (JP); Michiya Watanabe, Hokkaido (JP); Yuji Yamagishi, Hokkaido (JP); Yasuhiro Nishimura, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 404 days.

(21) Appl. No.: 18/252,671

(22) PCT Filed: Nov. 16, 2021

(86) PCT No.: PCT/JP2021/042054
§ 371 (c)(1),
(2) Date: May 11, 2023

(87) PCT Pub. No.: WO2022/113822
PCT Pub. Date: Jun. 2, 2022

(65) Prior Publication Data

US 2024/0013955 A1 Jan. 11, 2024

(30) Foreign Application Priority Data

Nov. 25, 2020 (JP) ................................ 2020-194839

(51) Int. Cl.
*H01C 7/102* (2006.01)
*H01C 1/148* (2006.01)
(Continued)

(52) U.S. Cl.
CPC ............. *H01C 7/102* (2013.01); *H01C 1/148* (2013.01); *H01C 7/112* (2013.01); *H01C 17/28* (2013.01); *H01C 17/30* (2013.01)

(58) Field of Classification Search
CPC ........ H01C 7/102; H01C 7/112; H01C 1/148; H01C 17/28; H01C 17/30
See application file for complete search history.

(56) References Cited

U.S. PATENT DOCUMENTS 4,933,659 A 6/1990 Imai et al.
5,750,264 A * 5/1998 Ueno .................... H01C 1/142 428/688

(Continued)

FOREIGN PATENT DOCUMENTS

JP H02-007401 A 1/1990
JP H03-173402 A 7/1991

(Continued)

OTHER PUBLICATIONS

International Search Report dated Feb. 1, 2022 issued in International Patent Application No. PCT/JP2021/042054, with English translation.

*Primary Examiner* — Kyung S Lee
(74) *Attorney, Agent, or Firm* — Rimon P.C.

(57) ABSTRACT

A multilayer varistor includes a sintered body, a first external electrode, a second external electrode, a first internal electrode, a second internal electrode, and a high-resistivity portion. The first internal electrode is provided inside the sintered body and electrically connected to the first external electrode. The second internal electrode is provided inside the sintered body and electrically connected to the second external electrode. The high-resistivity portion includes: a surface high-resistivity portion provided to cover a surface of the sintered body; and an inner high-resistivity portion
(Continued)

extended inward from the surface high-resistivity portion inside the sintered body.

18 Claims, 2 Drawing Sheets

(51) Int. Cl.
*H01C 7/112* (2006.01)
*H01C 17/28* (2006.01)
*H01C 17/30* (2006.01)

(56) References Cited

U.S. PATENT DOCUMENTS

| | | | | |
|---|---|---|---|---|
| 5,866,196 A * | 2/1999 | Ueno | H01C 1/142 | 29/613 |
| 6,171,644 B1 * | 1/2001 | Jinno | H01C 7/18 | 29/613 |
| 6,232,867 B1 * | 5/2001 | Yoshida | H01C 17/285 | 338/21 |
| 6,813,137 B2 * | 11/2004 | Matsuoka | H01C 7/18 | 29/25.41 |
| 8,471,673 B2 * | 6/2013 | Tanaka | H01C 17/28 | 338/21 |
| 11,037,710 B2 * | 6/2021 | Ravindranathan | H01C 1/144 | |
| 11,908,599 B2 * | 2/2024 | Kawajiri | H01C 7/1006 | |
| 2002/0050909 A1 | 5/2002 | Jinno et al. | | |
| 2003/0043012 A1 * | 3/2003 | Shiraishi | H01C 7/102 | 338/21 |
| 2003/0043013 A1 | 3/2003 | Shiraishi et al. | | |
| 2004/0169267 A1 * | 9/2004 | Matsuoka | H01C 1/146 | 257/684 |

FOREIGN PATENT DOCUMENTS

| | | |
|---|---|---|
| JP | H09-205005 A | 8/1997 |
| JP | 2004-023090 A | 1/2004 |
| JP | 2007-242995 A | 9/2007 |
| JP | 2020-119935 A | 8/2020 |

* cited by examiner

MULTILAYER VARISTOR AND METHOD FOR MANUFACTURING THE SAME

CROSS-REFERENCE OF RELATED APPLICATIONS

This application is the U.S. National Phase under 35 U.S.C. § 371 of International Patent Application No. PCT/JP2021/042054, filed on Nov. 16, 2021, which in turn claims the benefit of Japanese Patent Application No. 2020-194839, filed on Nov. 25, 2020, the entire disclosures of which Applications are incorporated by reference herein.

TECHNICAL FIELD

The present disclosure generally relates to a multilayer varistor and a method for manufacturing the multilayer varistor, and more particularly relates to a multilayer varistor for use in various types of electronic devices and a method for manufacturing the multilayer varistor.

BACKGROUND ART

Recently, as various types of consumer electronic appliances and onboard electronic devices have been further downsized, varistors, forming part of those appliances and devices, have found an increasingly broad range of applications. That is why depending on their intended use, varistors are sometimes required to ensure an even higher degree of reliability than known ones. In a known multilayer varistor, the outer surface of its ceramic body is coated with glass to increase the reliability. Examples of known art documents related to the disclosure of the present application include the following Patent Document 1.

When the known multilayer varistor is exposed to an even more severe environment, however, its glass coating would peel off or cause cracks, thus possibly causing a decline in its reliability.

CITATION LIST

Patent Literature

Patent Literature 1: JP H03-173402 A

SUMMARY OF INVENTION

A multilayer varistor according to an aspect of the present disclosure includes a sintered body, a first external electrode, a second external electrode, a first internal electrode, a second internal electrode, and a high-resistivity portion. The first external electrode and the second external electrode are both provided outside the sintered body. The first internal electrode is provided inside the sintered body and electrically connected to the first external electrode. The second internal electrode is provided inside the sintered body and electrically connected to the second external electrode. The high-resistivity portion is provided in a surface region of the sintered body. The high-resistivity portion includes: a surface high-resistivity portion provided to cover a surface of the sintered body; and an inner high-resistivity portion extended inward from the surface high-resistivity portion inside the sintered body.

A multilayer varistor according to another aspect of the present disclosure includes a sintered body, a first external electrode, a second external electrode, a first internal electrode, and a second internal electrode. The first external electrode and the second external electrode are both provided outside the sintered body. The first internal electrode is provided inside the sintered body and electrically connected to the first external electrode. The second internal electrode is provided inside the sintered body and electrically connected to the second external electrode. The sintered body includes: a surface region including a surface of the sintered body; and a facing region where the first internal electrode and the second internal electrode face each other. The surface region includes a high-resistivity portion which forms at least part of the surface region. A porosity in the surface region is smaller than a porosity in the facing region.

A method for manufacturing a multilayer varistor according to still another aspect of the present disclosure includes a first step, a second step, a third step, and a fourth step. The first step includes providing a sintered body containing zinc oxide as a main component thereof and including a first internal electrode and a second internal electrode inside. The second step includes impregnating, at a reduced pressure, the sintered body with a solution containing silicon. The third step includes conducting, after the second step, heat treatment on the sintered body to form a high-resistivity portion, containing zinc silicate, in at least part of a surface region of the sintered body. The fourth step includes forming, on end faces of the sintered body, a first external electrode to be electrically connected to the first internal electrode and a second external electrode to be electrically connected to the second internal electrode. The high-resistivity portion includes: a surface high-resistivity portion provided to cover a surface of the sintered body; and an inner high-resistivity portion extended inward from the surface high-resistivity portion inside the sintered body.

A method for manufacturing a multilayer varistor according to yet another aspect of the present disclosure includes a first step, a second step, and a third step. The first step includes providing a sintered body including a first internal electrode and a second internal electrode inside. The second step includes impregnating the sintered body with a solution containing a component to form a high-resistivity portion when introduced into the sintered body. The third step includes conducting heat treatment on the sintered body to form the high-resistivity portion in at least part of a surface region of the sintered body. A porosity in the surface region after the third step is smaller than a porosity in a facing region where the first internal electrode and the second internal electrode face each other.

DESCRIPTION OF EMBODIMENTS

(1) Overview

A multilayer varistor according to an exemplary embodiment of the present disclosure will now be described with reference to the accompanying drawings. Note that the drawings to be referred to in the following description of embodiments are all schematic representations. Thus, the ratio of the dimensions (including thicknesses) of respective constituent elements illustrated on the drawings does not always reflect their actual dimensional ratio.

Figure 1:
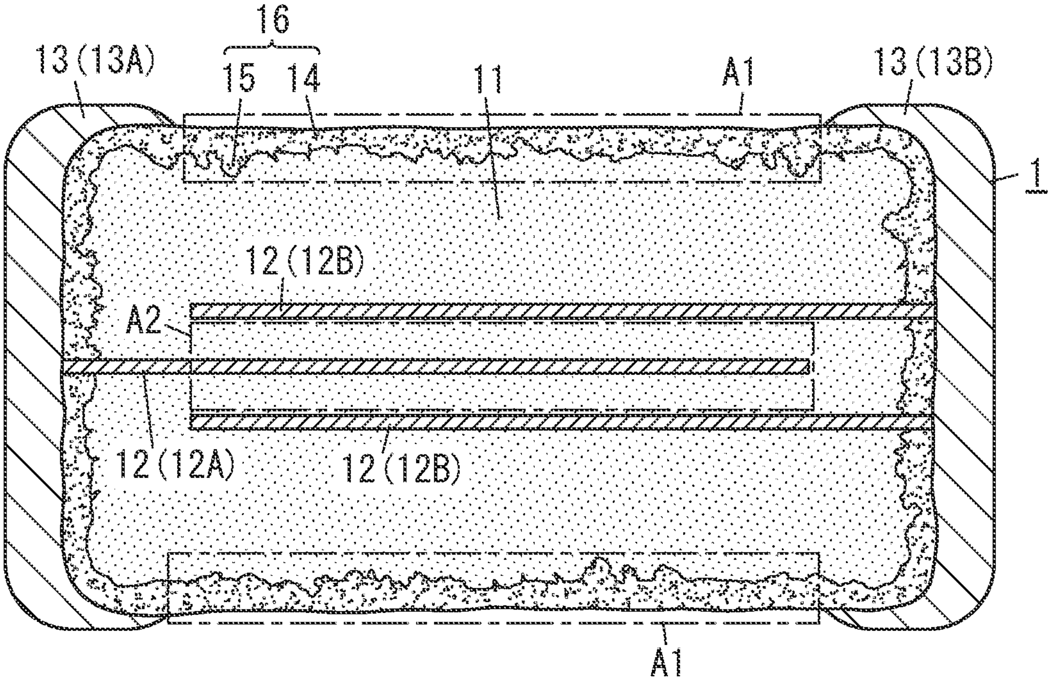
FIG. 1 is a schematic cross-sectional view of a multilayer varistor according to an exemplary embodiment of the present disclosure.

A multilayer varistor 1 according to this embodiment includes a sintered body 11, a first external electrode 13A, a second external electrode 13B, a first internal electrode 12A, a second internal electrode 12B, and a high-resistivity portion 16 as shown in FIG. 1.

The first external electrode 13A and the second external electrode 13B are both provided outside the sintered body 11.

The first internal electrode 12A is provided inside the sintered body 11 and electrically connected to the first external electrode 13A.

The second internal electrode 12B is provided inside the sintered body 11 and electrically connected to the second external electrode 13B.

The high-resistivity portion 16 is provided in a surface region A1 of the sintered body 11. The high-resistivity portion 16 includes: a surface high-resistivity portion 14 provided to cover the surface of the sintered body 11; and an inner high-resistivity portion 15 extended inward from the surface high-resistivity portion 14 inside the sintered body 11.

In this embodiment, the sintered body 11 needs to be provided with at least one pair of external electrodes, namely, the first external electrode 13A and the second external electrode 13B. When a voltage is applied between the first external electrode 13A and the second external electrode 13B, one of the first external electrode 13A and the second external electrode 13B serves as an electrode with the higher potential and the other of the first external electrode 13A and the second external electrode 13B serves as an electrode with the lower potential. Also, the first internal electrode 12A includes one or more electrodes electrically connected to the first external electrode 13A. Likewise, the second internal electrode 12B includes one or more electrodes electrically connected to the second external electrode 13B. The surface region A1 of the sintered body 11 includes the surface of the sintered body 11 and a part extended inward from the surface of the sintered body 11 inside the sintered body 11, which refer to respective parts of the sintered body 11 provided with the surface high-resistivity portion 14 and the inner high-resistivity portion 15. As used herein, the "surface" of the sintered body 11 refers to the surface exposed to the external environment when the surface high-resistivity portion 14 to cover the sintered body 11 has not been formed yet.

According to this aspect, the surface of the sintered body 11 is covered with the surface high-resistivity portion 14 and the inner high-resistivity portion 15 is provided to extend inward from the surface high-resistivity portion 14 inside the sintered body 11. This reduces, even when thermal or mechanical force is applied to the sintered body 11, the chances of the surface high-resistivity portion 14 peeling off, thus increasing the reliability. In the following description of embodiments, the surface high-resistivity portion 14 formed on the surface of the sintered body 11 will be hereinafter sometimes referred to as an "insulating layer" and the inner high-resistivity portion 15 extended inward from the surface high-resistivity portion 14 will be hereinafter sometimes referred to as an "insulator."

The present inventors carried out research and development on various configurations of a varistor according to this embodiment. As a result, the present inventors discovered that adjusting the porosity of the sintered body 11 would prevent the surface high-resistivity portion 14 from causing peeling, cracking or other inconveniences.

As described above, the multilayer varistor 1 according to this embodiment includes the sintered body 11, the first external electrode 13A, the second external electrode 13B, the first internal electrode 12A, and the second internal electrode 12B. The sintered body 11 includes: a surface region A1 including the surface of the sintered body 11; and a facing region A2 where the first internal electrode 12A and the second internal electrode 12B face each other. The surface region A1 includes a high-resistivity portion 16 which forms at least part of the surface region A1. A porosity in the surface region A1 is smaller than a porosity in the facing region A2.

In this embodiment, the surface region A1 is a region including the surface of the sintered body 11 and includes a region where the high-resistivity portion 16 is provided. The facing region A2 includes a region where the first internal electrode 12A and the second internal electrode 12B, which are electrically connected to two different external electrodes, namely, the first external electrode 13A and the second external electrode 13B, respectively, face each other. The porosity in the surface region A1 is the percentage by volume of the total volume of pores to the volume of either the entire surface region A1 or a predetermined part of the surface region A1. Meanwhile, the porosity in the facing region A2 is the percentage by volume of the total volume of pores to the volume of either the entire facing region A2 or a predetermined part of the facing region A2.

According to this aspect, the porosity in the surface region A1 is smaller than the porosity in the facing region A2, thus reducing the chances of water reaching the facing region A2 and thereby improving the moisture resistance performance of the multilayer varistor 1.

In the following description of embodiments, the first external electrode 13A and the second external electrode 13B will be hereinafter collectively referred to as "external electrodes 13" and the first internal electrode 12A and the second internal electrode 12B will be hereinafter collectively referred to as "internal electrodes 12."

(2) Details

FIG. 1 is a cross-sectional view of a multilayer varistor 1 according to an exemplary embodiment of the present disclosure. The sintered body 11 of the multilayer varistor 1 except the external electrodes 13 has the shape of a rectangular parallelepiped having a length of 1.6 mm, a width of 0.8 mm, and a height of 0.6 mm Note that the shape of the sintered body 11 does not have to be a rectangular parallelepiped but may be changed as appropriate.

The sintered body 11 is made of a semiconductor ceramic component with a nonlinear resistance characteristic. In this multilayer varistor 1, the sintered body 11 is configured as a multi-layer stack.

The sintered body 11 may contain, for example, ZnO as a main component thereof and also contain $Bi_2O_3$, $Co_2O_3$, $MnO_2$, $Sb_2O_3$, NiO, $GeO_2$, or $Pr_6O_{11}$, $Co_2O_3$, $CaCO_3$, and $Cr_2O_3$ as sub-components thereof. In the sintered body 11, a varistor layer is formed by causing ZnO to be sintered and form a solid solution with some of these sub-components and causing the other sub-components to deposit on the grain boundary, and such varistor layers and the internal electrodes 12 are stacked alternately one on top of another, thereby forming a multilayer structure in which the internal electrodes 12 are arranged between the varistor layers. In this embodiment, a plurality of varistor layers are stacked one on top of another in the upward/downward direction as indicated in FIG. 1 and the internal electrodes 12 are formed between the respective varistor layers.

The external electrodes 13 are provided on both end surfaces of the sintered body 11 and are electrically connected to the internal electrodes 12. In this embodiment, the first external electrode 13A is provided at a first end (i.e., at the left end in FIG. 1) of the sintered body 11 and the second external electrode 13B is provided at a second end (i.e., the right end in FIG. 1) of the sintered body 11. In addition, inside the sintered body 11, provided are at least one first internal electrode 12A electrically connected to the first external electrode 13A and at least one second internal electrode 12B electrically connected to the second external electrode 13B. In this embodiment, one first internal electrode 12A electrically connected to the first external electrode 13A and two second internal electrodes 12B electrically connected to the second external electrode 13B are provided inside the sintered body 11. In this structure, the first internal electrode 12A is interposed between the two second internal electrodes 12B. In addition, the first internal electrode 12A protrudes from the first end of the sintered body 11 toward the second end thereof to reach a point before the second end. Each of the second internal electrodes 12B protrudes from the second end of the sintered body 11 toward the first end thereof to reach a point before the first end. That is to say, a part of the first internal electrode 12A and respective parts of the second internal electrodes 12B overlap with each other in the stacking direction (i.e., the upward/downward direction in FIG. 1). A region where the first internal electrode 12A and the second internal electrodes 12B face each other inside the sintered body 11 is the facing region A2. In this structure, the high-resistivity portion 16 is absent from the facing region A2 inside the sintered body 11, thus reducing the chances of the electrical characteristics of the multilayer varistor 1 varying due to the presence of the high-resistivity portion 16.

The pair of external electrodes 13 (namely, the first external electrode 13A and the second external electrode 13B) included in the sintered body 11 are mounted on a printed wiring board on which an electric circuit is formed. In this case, the external electrodes 13 may be metallic electrodes provided at the first and second ends of the sintered body 11 or metallic electrodes, of which the surface is plated, whichever is appropriate. Generally speaking, when some component is mounted on a board, the component is often soldered. That is why the external electrodes 13 preferably have their surface plated. The multilayer varistor 1 may be, for example, connected to an input end of an electric circuit. When a voltage exceeding a predetermined threshold voltage is applied between the first external electrode 13A and the second external electrode 13B, the electrical resistance decreases steeply in the varistor layers between the first external electrode 13A and the second external electrode 13B and an electric current flows through the varistor layers, thus enabling protecting an electric circuit that follows the multilayer varistor 1.

Also, the surface of the sintered body 11 is an insulating layer (surface high-resistivity portion 14) having an average thickness of about 3 μm and made of zinc silicate. In addition, a plurality of insulators of zinc silicate, extended inward from the surface zinc silicate layer (surface high-resistivity portion 14) inside the sintered body 11, are further provided. In this embodiment, the sintered body 11 contains zinc oxide as a main component thereof and the high-resistivity portion 16 contains zinc silicate. In this case, the inner high-resistivity portion 15 is formed by the plurality of insulators extended inward from the surface high-resistivity portion 14 inside the sintered body 11. As can be seen, the sintered body 11 is provided with the high-resistivity portion 16 including the surface high-resistivity portion 14 and the inner high-resistivity portion 15. The surface of the sintered body 11 is covered with the surface high-resistivity portion 14 as an insulating layer and the inner high-resistivity portion 15, including a plurality of insulators extended inward from the surface high-resistivity portion 14 inside the sintered body 11, is provided. In this case, zinc oxide as a main component of the sintered body 11 and zinc silicate as a constituent material for the insulating layer (surface high-resistivity portion 14) are both made of ceramic materials and their coefficients of linear expansion are close to each other. That is why when heat is applied to the sintered body 11, the thermal stress difference caused is so little that the insulating layer (surface high-resistivity portion 14) is unlikely to peel off. In addition, the pores in the surface region A1 of the sintered body 11 are filled with zinc silicate to form the inner high-resistivity portion 15. Thus, even if mechanical force is applied to the sintered body 11, there are fewer sharp grooves that are present in pores to which the stress is easily concentrated, thus reducing the chances of the insulating layer (surface high-resistivity portion 14) peeling off. As can be seen, this reduces, even if thermal or mechanical force is applied to the sintered body 11, the chances of the surface high-resistivity portion 14 peeling off, thus contributing to increasing the reliability.

Figure 2:
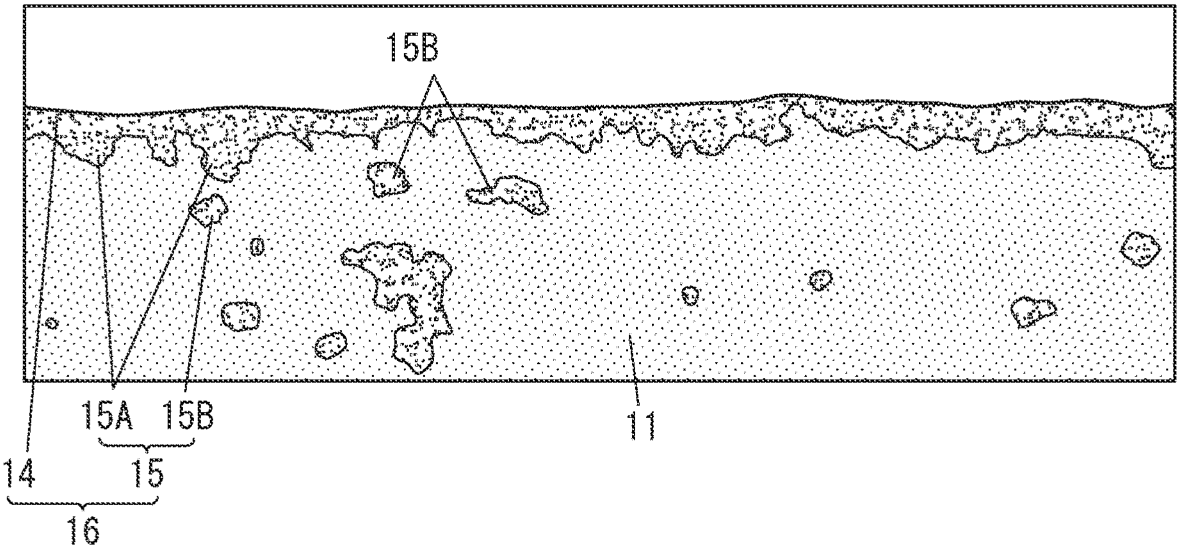
FIG. 2 is a schematic cross-sectional view of portion A1 shown in FIG. 1.

In this structure, the inner high-resistivity portion 15 extends inward (i.e., in the stacking direction) from the surface high-resistivity portion 14 inside the sintered body 11 and includes a part, of which the dimension in the depth direction is greater than its dimension along the surface of the sintered body 11 on which the sintered body 11 is in contact with the surface high-resistivity portion 14. In this embodiment, such a part of the inner high-resistivity portion 15, which has been formed to extend inward from the surface high-resistivity portion 14 inside the sintered body 11, will be hereinafter referred to as a "first inner high-resistivity portion 15A" (refer to FIG. 2). The first inner high-resistivity portion 15A is formed such that its dimension measured along the surface of the sintered body 11 (i.e., measured in the rightward/leftward direction) in contact with the surface high-resistivity portion 14 is smaller than its dimension measured in the depth direction (i.e., the direction pointing toward the internal electrodes 12). The first inner high-resistivity portion 15A is formed by filling continuous micropores extended inward from the surface high-resistivity portion 14 inside the sintered body 11 with the insulators of zinc silicate. Thus, the high-resistivity portion 16 preferably includes the surface high-resistivity portion 14 provided to cover the surface of the sintered body 11 and the first inner high-resistivity portion 15A formed to extend inward from the surface high-resistivity portion 14 inside the sintered body 11.

In addition, the inner high-resistivity portion 15 may further include a second inner high-resistivity portion 15B (refer to FIG. 2) provided to be out of contact with the surface high-resistivity portion 14. The second inner high-resistivity portion 15B is formed out of contact with the surface high-resistivity portion 14 due to, for example, shrinkage of the sintered body 11 while the sintered body 11 is subjected to heat treatment after the continuous micropores, extended inward from the surface high-resistivity portion 14 inside the sintered body 11, have been impregnated with a solution containing zinc silicate. Thus, the high-resistivity portion 16 preferably includes the surface high-resistivity portion 14 provided to cover the surface of the sintered body 11 and the second inner high-resistivity portion 15B provided inside the sintered body 11 to be out of contact with the surface high-resistivity portion 14. More specifically, the high-resistivity portion 16 preferably includes the surface high-resistivity portion 14, the first inner high-resistivity portion 15A, and the second inner high-resistivity portion 15B.

The surface high-resistivity portion 14 preferably has an average thickness equal to or greater than 0.3 μm and equal to or less than 10 μm. As used herein, the "average thickness" refers to an arithmetic mean of the thicknesses of the surface high-resistivity portion 14 as measured at multiple points (e.g., at ten arbitrary points) of the surface high-resistivity portion 14. If the average thickness of the surface high-resistivity portion 14 were less than 0.3 μm, then the surface high-resistivity portion 14 would be absent here and there due to dispersions, thus possibly causing a decline in reliability. Conversely, setting the average thickness at a value greater than 10 μm would make it easier to cause peeling or cracking while the surface high-resistivity portion 14 goes through a heat cycle, for example.

Also, the inner high-resistivity portion 15 (first inner high-resistivity portion 15A) extended inward from the surface high-resistivity portion 14 inside the sintered body 11 preferably has a maximum length equal to or greater than 10 μm to prevent the inner high-resistivity portion from reaching any of the internal electrodes 12. That is to say, it is preferable that the inner high-resistivity portion 15 be in contact with neither the first internal electrode 12A nor the second internal electrode 12B. Making the length of the inner high-resistivity portion 15 shorter than 10 μm would make it difficult to achieve the intended advantage sufficiently. On the other hand, if the length of the inner high-resistivity portion 15 were greater than the distance from a surface of the internal electrodes 12 in contact with an ineffective layer of the sintered body 11 to the surface high-resistivity portion 14 to allow the inner high-resistivity portion 15 to penetrate into an effective layer of the sintered body 11, then desired electrical characteristic would not be achieved easily. As used herein, the "ineffective layer" of the sintered body 11 refers to a region located outside the plurality of internal electrodes 12 in the stacking direction, while the "effective layer" of the sintered body 11 refers to a region located between the plurality of internal electrodes 12 in the stacking direction.

Next, a method for manufacturing a multilayer varistor according to an exemplary embodiment of the present disclosure will be described.

The method for manufacturing a multilayer varistor 1 according to this embodiment includes at least the first, second, and third steps to be described below and may further include a fourth step.

First Step

The first step includes providing a sintered body 11 including the first internal electrode 12A and the second internal electrode 12B inside. More specifically, the first step includes providing a sintered body 11 containing zinc oxide as a main component thereof and including the first internal electrode 12A and the second internal electrode 12B inside.

First, varistor materials, including ZnO as a main component and additives such as $Bi_2O_3$, $Co_3O_4$, $MnO_2$, $Sb_2O_3$, NiO, and $GeO_2$, are mixed together and pulverized, and then an organic binder such as polyvinyl butyral resin, a solvent such as normal butyl acetate, and a plasticizer such as benzyl butyl phthalate are added to the mixture, thereby obtaining a slurry. Then, the slurry is molded by a doctor blade method, for example, to form a ceramic sheet as the barrier layer.

Meanwhile, a conductive metallic powder such as an Ag powder, an organic binder such as polyvinyl butyral resin, a solvent such as normal butyl acetate, and a plasticizer such as benzyl butyl phthalate are added to the mixture, and then the mixture is kneaded using a roll mill, for example, thereby forming a metallic paste as a material for the internal electrodes 12.

Next, an internal electrode having a predetermined shape is printed on a ceramic sheet, and then laminating, pressing, cutting, baking, and chamfering are performed to obtain the sintered body 11. In this embodiment, the porosity of the sintered body 11 in the first step is preferably equal to or greater than 4% and equal to or less than 20%.

Second Step

The second step includes impregnating, at a reduced pressure, the sintered body 11 with a solution containing silicon. In other words, the second step includes impregnating the sintered body 11 with a solution containing a component that will form the high-resistivity portion 16 when introduced into the sintered body 11.

Specifically, the sintered body 11 is immersed in a silicate solution and the pressure is reduced to about 0.5 kPa, thereby impregnating the silicate solution onto the surface of the sintered body 11. Thereafter, heat treatment is conducted at 250° C. to vaporize the water. In the vicinity of the surface of the sintered body 11, there are micropores connected to the surface. The water is vaporized with the silicate solution poured into the micropores, thus allowing the silicate to be left in the micropores. As the silicate solution, a sodium silicate aqueous solution, which is inexpensive, easily available, easy to handle, and easy to produce a desired chemical reaction, is preferably used. In other words, the solution containing a component that will form the high-resistivity portion 16 when introduced into the sintered body 11 (specifically, the solution containing silicon) is preferably a sodium silicate aqueous solution. As used herein, the desired chemical reaction refers to a reaction in which a silicate and ZnO produce zinc silicate through heat treatment.

As this sodium silicate aqueous solution, a sodium silicate aqueous solution, of which the molar ratio is approximately 25 when converted into an $SiO_2/Na_2O$ ratio, is used. Also, this sodium silicate aqueous solution has a viscosity of about 10 mPa·s at 20° C.

Third Step

The third step includes conducting, after the second step, heat treatment on the sintered body 11 to form the high-resistivity portion 16 (specifically, the high-resistivity portion 16 containing zinc silicate) in at least part of a surface region of the sintered body 11.

The third step includes conducing heat treatment on the sintered body 11 at about 850° C. Note that the temperature at which the heat treatment is conducted on the sintered body 11 in the third step is preferably approximately as high as, or higher than, the temperature at which the sintered body 11 is baked in the first step. By conducting this heat treatment, a surface high-resistivity portion 14 made of zinc silicate, in which ZnO of the sintered body 11 and sodium silicate are chemically bonded to each other, is formed on the surface of the sintered body 11. In this case, the surface high-resistivity portion 14 has an average thickness of about 3 μm. In addition, the sodium silicate left inside the micropores around the surface of the sintered body 11 also reacts to surrounding ZnO, thereby forming the inner high-resistivity portion 15 connected to the surface high-resistivity portion 14.

As can be seen, the high-resistivity portion 16 formed in the third step includes: the surface high-resistivity portion 14 provided to cover the surface of the sintered body 11; and the inner high-resistivity portion 15 extended inward from the surface high-resistivity portion 14 inside the sintered body 11.

After the third step, the porosity in the surface region A1 is smaller than the porosity in the facing region A2 where the first internal electrode 12A and the second internal electrode 12B face each other. In this example, the porosity in the surface region A1 after the third step is preferably equal to or greater than 0% by volume and less than 2% by volume. This enables reducing penetration of water and other types of foreign matter. Meanwhile, the porosity in the facing region A2 after the third step is preferably equal to or greater than 2% by volume and less than 6% by volume.

Fourth Step

The fourth step includes forming, on the end surfaces of the sintered body 11, a first external electrode 13A to be electrically connected to the first internal electrode 12A and a second external electrode 13B to be electrically connected to the second internal electrode 12B.

The fourth step includes forming the external electrodes 13 by applying a metallic paste onto the end surfaces of the sintered body 11 and baking the metallic paste. In this manner, a multilayer varistor is completed. The metallic paste includes Ag, a glass frit, a resin, and a solvent. This allows the first internal electrode 12A exposed on the left end surface of the sintered body 11 to be electrically connected to the first external electrode 13A formed on the left end surface of the sintered body 11. In addition, this allows the second internal electrodes 12B exposed on the right end surface of the sintered body 11 to be electrically connected to the second external electrode 13B formed on the right end surface of the sintered body 11. Alternatively, each of these external electrodes 13 may also be formed by baking the metallic paste on the end surfaces of the sintered body 11 and then plating the metallic paste with nickel or tin. Even so, the chances of the plating flowing may also be reduced because the surface high-resistivity portion 14 has been formed as an insulating layer of zinc silicate on the surface of the sintered body 11.

Optionally, the multilayer varistor 1 may include, as the external electrodes 13, primary external electrodes formed on both end surfaces of the sintered body 11 and secondary external electrodes formed to cover the primary external electrodes. In that case, the primary external electrodes may be formed by applying and baking a metallic paste onto both the entire end surfaces of the sintered body 11 either before the second step or before the third step. The metallic paste as a material for the primary external electrodes may be obtained by mixing together a metal such as an Ag powder, glass frit including $Bi_2O_3$, $SiO_2$ and other additives, a vehicle, and a solvent. The primary external electrodes are formed either before the second step or before the third step. Thus, the high-resistivity portion 16 is not formed on any of the right and left end portions of the sintered body 11.

A multilayer varistor 1 according to the exemplary embodiment of the present disclosure was subjected to a heat cycle test in which a thermal shock of −55° C. and a thermal shock of 150° C. were applied 2000 times to the multilayer varistor 1. As a result, the crack occurrence rate was 0%. Specifically, no cracks were caused in the surface high-resistivity portion 14, thus enabling providing a multilayer varistor 1 with the ability to prevent water and other types of foreign matter from entering externally and reduce the insufficient insulation. In contrast, in a known multilayer varistor in which the surface of the sintered body was coated with a glass film with a thickness of 3 μm, cracks were caused at a rate of 12% in the glass film after the heat cycle test.

Water glass which is generally used as a coating for an electronic component has an $SiO_2/M_2O$ molar ratio of about 3, where M is an alkali metal element. Such water glass has so high viscosity and so poor flowability that the water glass cannot enter the micropores of the sintered body 11 sufficiently and would have an excessive thickness, thus possibly causing peeling and cracking when subjected to a heat cycle or significant external force. In contrast, according to this embodiment, a thin and dense surface high-resistivity portion 14 and a plurality of first inner high-resistivity portions 15A connected to the surface high-resistivity portion 14 and extended inward are provided, thus enabling providing a multilayer varistor 1 that would rarely cause peeling or cracking.

The sodium silicate aqueous solution preferably has a molar ratio equal to or greater than 23 and equal to or less than 29 when the molar ratio is converted into an $SiO_2/Na_2O$ ratio. In other words, in the sodium silicate aqueous solution, the molar ratio of $SiO_2$ to $Na_2O$ is preferably equal to or greater than 23 and equal to or less than 29. If the molar ratio were less than 23, then the viscosity would be too high to fill the micropores of the sintered body sufficiently easily. Conversely, if the molar ratio were greater than 29, then the glass transition temperature and the reaction temperature would both be so high that the internal electrodes could be affected adversely as well.

Also, the solution containing silicon, specifically, the silicate solution, preferably has a viscosity equal to or greater than 1 mPa·s and equal to or less than 20 mPa·s at 20° C. If the viscosity were less than 1 mPa·s, then the content of silicon would be too little to produce a sufficient amount of zinc silicate. Conversely, if the viscosity were greater than 20 mPa·s, then the viscosity would be too high to fill the micropores of the sintered body 11 sufficiently easily.

Furthermore, the second step (impregnating step) preferably includes impregnating the sintered body at a reduced pressure equal to or higher than 0.1 kPa and equal to or lower than 50 kPa. More specifically, the impregnating step (second step) is more preferably performed at a reduced pressure equal to or higher than 0.1 kPa and equal to or lower than 0.9 kPa. The reason is that even if the pressure were reduced to less than 0.1 kPa, the advantage would not be increased significantly. On the other hand, if the pressure were higher than 0.9 kPa, then the silicate solution would not enter the micropores of the sintered body 11 sufficiently.

Furthermore, the third step (reaction step) preferably includes conducting the heat treatment at a temperature equal to or higher than 825° C. and equal to or lower than 900° C. If the temperature were lower than 825° C., then the reaction would not be advanced smoothly enough to form a dense insulating film (high-resistivity portion 16) easily. Conversely, if the temperature were higher than 900° C., then the internal electrodes 12 would also be affected.

In the exemplary embodiment described above, the sintered body 11 includes a single first external electrode 13A and a single second external electrode 13B. However, this is only an example and should not be construed as limiting. The number of the first external electrode(s) 13A provided may be one or plural, whichever is appropriate. The number of the second external electrode(s) 13B provided may also be one or plural, whichever is appropriate. Optionally, the sintered body 11 may be provided with not only the first external electrode 13A and the second external electrode 13B but also one or more third external electrodes.

Also, in the exemplary embodiment described above, the sintered body 11 includes a single first internal electrode 12A and two second internal electrodes 12B. However, this is only an example and should not be construed as limiting. The number of the first internal electrode(s) 12A provided may be one or plural, whichever is appropriate. The number of the second internal electrode(s) 12B provided may also be one or plural, whichever is appropriate. Optionally, the sintered body 11 may be provided with not only the first internal electrode 12A and the second internal electrode 12B but also one or more third internal electrodes electrically connected to the third external electrode(s).

Recapitulation

A multilayer varistor (1) according to a first aspect includes a sintered body (11), a first external electrode (13A), a second external electrode (13B), a first internal electrode (12A), a second internal electrode (12B), and a high-resistivity portion (16). The first external electrode (13A) and the second external electrode (13B) are both provided outside the sintered body (11). The first internal electrode (12A) is provided inside the sintered body (11) and electrically connected to the first external electrode (13A). The second internal electrode (12B) is provided inside the sintered body (11) and electrically connected to the second external electrode (13B). The high-resistivity portion (16) is provided in a surface region (A1) of the sintered body (11). The high-resistivity portion (16) includes: a surface high-resistivity portion (14) provided to cover a surface of the sintered body (11); and an inner high-resistivity portion (15) extended inward from the surface high-resistivity portion (14) inside the sintered body (11).

In a multilayer varistor (1) according to a second aspect, which may be implemented in conjunction with the first aspect, the sintered body (11) contains zinc oxide as a main component thereof, and the high-resistivity portion (16) contains zinc silicate.

In a multilayer varistor (1) according to a third aspect, which may be implemented in conjunction with the first or second aspect, the surface high-resistivity portion (14) has an average thickness equal to or greater than 0.3 μm and equal to or less than 10 μm.

In a multilayer varistor (1) according to a fourth aspect, which may be implemented in conjunction with any one of the first to third aspects, the inner high-resistivity portion (15) has a maximum length equal to or greater than 10 μm, and the inner high-resistivity portion (15) is in contact with neither the first internal electrode (12A) nor the second internal electrode (12B).

A multilayer varistor (1) according to a fifth aspect includes a sintered body (11), a first external electrode (13A), a second external electrode (13B), a first internal electrode (12A), and a second internal electrode (12B). The first external electrode (13A) and the second external electrode (13B) are both provided outside the sintered body (11). The first internal electrode (12A) is provided inside the sintered body (11) and electrically connected to the first external electrode (13A). The second internal electrode (12B) is provided inside the sintered body (11) and electrically connected to the second external electrode (13B). The sintered body (11) includes: a surface region (A1) including a surface of the sintered body (11); and a facing region (A2) where the first internal electrode (12A) and the second internal electrode (12B) face each other. The surface region (A1) includes a high-resistivity portion (16) which forms at least part of the surface region (A1). A porosity in the surface region (A1) is smaller than a porosity in the facing region (A2).

In a multilayer varistor (1) according to a sixth aspect, which may be implemented in conjunction with the fifth aspect, the high-resistivity portion (16) includes: a surface high-resistivity portion (14) provided to cover the surface of the sintered body (11); and a first inner high-resistivity portion (15A) extended inward from the surface high-resistivity portion (14) inside the sintered body (11).

In a multilayer varistor (1) according to a seventh aspect, which may be implemented in conjunction with the fifth aspect, the high-resistivity portion (16) includes: a surface high-resistivity portion (14) provided to cover the surface of the sintered body (11); and a second inner high-resistivity portion (15B) provided inside the sintered body (11) to be out of contact with the surface high-resistivity portion (14).

In a multilayer varistor (1) according to an eighth aspect, which may be implemented in conjunction with any one of the fifth to seventh aspects, the high-resistivity portion (16) is absent from the facing region (A2) inside the sintered body (11).

In a multilayer varistor (1) according to a ninth aspect, which may be implemented in conjunction with any one of the fifth to eighth aspects, the porosity in the surface region (A1) is equal to or greater than 0% by volume and less than 2% by volume.

In a multilayer varistor (1) according to a tenth aspect, which may be implemented in conjunction with any one of the fifth to ninth aspects, the porosity in the facing region (A2) is equal to or greater than 2% by volume and less than 6% by volume.

A method for manufacturing a multilayer varistor (1) according to an eleventh aspect includes a first step, a second step, a third step, and a fourth step. The first step includes providing a sintered body (11) containing zinc oxide as a main component thereof and including a first internal electrode (12A) and a second internal electrode (12B) inside. The second step includes impregnating, at a reduced pressure, the sintered body (11) with a solution containing silicon. The third step includes conducting, after the second step, heat treatment on the sintered body (11) to form a high-resistivity portion (16), containing zinc silicate, in at least part of a surface region of the sintered body (11). The fourth step includes forming, on end faces of the sintered body (11), a first external electrode (13A) to be electrically connected to the first internal electrode (12A) and a second external electrode (13B) to be electrically connected to the second internal electrode (12B). The high-resistivity portion (16) includes: a surface high-resistivity portion (14) provided to cover a surface of the sintered body (11); and an inner high-resistivity portion (15) extended inward from the surface high-resistivity portion (14) inside the sintered body (11).

In a method for manufacturing a multilayer varistor (1) according to a twelfth aspect, which may be implemented in conjunction with the eleventh aspect, the solution containing silicon is a sodium silicate solution.

In a method for manufacturing a multilayer varistor (1) according to a thirteenth aspect, which may be implemented in conjunction with the twelfth aspect, in the sodium silicate solution, a molar ratio of $SiO_2$ to $Na_2O$ is equal to or greater than 23 and equal to or less than 29.

In a method for manufacturing a multilayer varistor (1) according to a fourteenth aspect, which may be implemented in conjunction with any one of the eleventh to thirteenth aspects, the solution containing silicon has a viscosity equal to or greater than 1 mPa·s and equal to or less than 20 mPa·s at 20° C.

In a method for manufacturing a multilayer varistor (1) according to a fifteenth aspect, which may be implemented in conjunction with any one of the eleventh to fourteenth aspects, the second step includes impregnating the sintered body (11) at a reduced pressure equal to or higher than 0.1 kPa and equal to or lower than 50 kPa. In a method for manufacturing a multilayer varistor (1) according to a sixteenth aspect, which may be implemented in conjunction with any one of the eleventh to fifteenth aspects, the third step includes conducting the heat treatment at a temperature equal to or higher than 825° C. and equal to or lower than 900° C.

A method for manufacturing a multilayer varistor (1) according to a seventeenth aspect includes a first step, a second step, and a third step. The first step includes providing a sintered body (11) including a first internal electrode (12A) and a second internal electrode (12B) inside. The second step includes impregnating the sintered body (11) with a solution containing a component to form a high-resistivity portion (16) when introduced into the sintered body (11). The third step includes conducting heat treatment on the sintered body (11) to form the high-resistivity portion (16) in at least part of a surface region (A1) of the sintered body (11). A porosity in the surface region (A1) after the third step is smaller than a porosity in a facing region (A2) where the first internal electrode (12A) and the second internal electrode (12B) face each other.

In a method for manufacturing a multilayer varistor (1) according to an eighteenth aspect, which may be implemented in conjunction with the seventeenth aspect, the solution is a sodium silicate solution.

In a method for manufacturing a multilayer varistor (1) according to a nineteenth aspect, which may be implemented in conjunction with the eighteenth aspect, in the sodium silicate solution, a molar ratio of $SiO_2$ to $Na_2O$ is equal to or greater than 23 and equal to or less than 29.

In a method for manufacturing a multilayer varistor (1) according to a twentieth aspect, which may be implemented in conjunction with any one of the seventeenth to nineteenth aspects, the porosity in the surface region (A1) after the third step is equal to or greater than 0% by volume and less than 2% by volume.

In a method for manufacturing a multilayer varistor (1) according to a twenty-first aspect, which may be implemented in conjunction with any one of the seventeenth to twentieth aspects, the porosity in the facing region (A2) after the third step is equal to or greater than 2% by volume and less than 6% by volume.

In a method for manufacturing a multilayer varistor (1) according to a twenty-second aspect, which may be implemented in conjunction with any one of the seventeenth to twenty-first aspects, the porosity of the sintered body (11) in the first step is equal to or greater than 4% by volume and less than 20% by volume.

Note that the constituent elements according to the second to fourth aspects and the sixth to tenth aspects are not essential constituent elements for the multilayer varistor (1) but may be omitted as appropriate.

Note that the features according to the thirteenth to sixteenth aspects and the eighteenth to twenty-second aspects are not essential features for the method for manufacturing a multilayer varistor (1) but may be omitted as appropriate.

INDUSTRIAL APPLICABILITY

A multilayer varistor according to the present disclosure ensures high reliability even in a severe environment, and therefore, is highly useful industrially.

REFERENCE SIGNS LIST

1 Multilayer Varistor
11 Sintered body
12 Internal Electrode
12A First Internal Electrode
12B Second Internal Electrode
13 External Electrode
13A First External Electrode
13B Second External Electrode
14 Insulating Layer (Surface High-Resistivity Portion)
15 Insulator (Inner High-Resistivity Portion)
15A First Inner High-Resistivity Portion
15B Second Inner High-Resistivity Portion
16 High-Resistivity Portion
A1 Surface Region
A2 Facing Region

The invention claimed is:

1. A multilayer varistor comprising:

a sintered body;

a first external electrode and a second external electrode both provided outside the sintered body;

a first internal electrode provided inside the sintered body and electrically connected to the first external electrode;

a second internal electrode provided inside the sintered body and electrically connected to the second external electrode; and a high-resistivity portion provided in a surface region of the sintered body, the high-resistivity portion including: a surface high-resistivity portion provided to cover a surface of the sintered body; and an inner high-resistivity portion extended inward from the surface high-resistivity portion inside the sintered body, the inner high-resistivity portion having a maximum length equal to or greater than 10 μm, and the inner high-resistivity portion being in contact with neither the first internal electrode nor the second internal electrode.

2. The multilayer varistor of claim 1, wherein the sintered body contains zinc oxide as a main component thereof, and the high-resistivity portion contains zinc silicate.

3. The multilayer varistor of claim 1, wherein the surface high-resistivity portion has an average thickness equal to or greater than 0.3 μm and equal to or less than 10 μm.

4. A multilayer varistor comprising:

a sintered body;

a first external electrode and a second external electrode both provided outside the sintered body;

a first internal electrode provided inside the sintered body and electrically connected to the first external electrode; and a second internal electrode provided inside the sintered body and electrically connected to the second external electrode, the sintered body including: a surface region including a surface of the sintered body; and a facing region where the first internal electrode and the second internal electrode face each other, the surface region including a high-resistivity portion, the high-resistivity portion forming at least part of the surface region, a porosity in the surface region being smaller than a porosity in the facing region, and the porosity in the facing region being equal to or greater than 2% by volume and less than 6% by volume.

5. The multilayer varistor of claim 4, wherein the high-resistivity portion includes: a surface high-resistivity portion provided to cover the surface of the sintered body; and a first inner high-resistivity portion extended inward from the surface high-resistivity portion inside the sintered body.

6. The multilayer varistor of claim 4, wherein the high-resistivity portion includes: a surface high-resistivity portion provided to cover the surface of the sintered body; and a second inner high-resistivity portion provided inside the sintered body to be out of contact with the surface high-resistivity portion.

7. The multilayer varistor of claim 4, wherein the high-resistivity portion is absent from the facing region inside the sintered body.

8. The multilayer varistor of claim 4, wherein the porosity in the surface region is equal to or greater than 0% by volume and less than 2% by volume.

9. A method for manufacturing a multilayer varistor, the method comprising:

a first step including providing a sintered body containing zinc oxide as a main component thereof and including a first internal electrode and a second internal electrode inside;

a second step including impregnating, at a reduced pressure, the sintered body with a solution containing silicon;

a third step including conducting, after the second step, heat treatment on the sintered body to form a high-resistivity portion, containing zinc silicate, in at least part of a surface region of the sintered body; and a fourth step including forming, on end faces of the sintered body, a first external electrode to be electrically connected to the first internal electrode and a second external electrode to be electrically connected to the second internal electrode, the high-resistivity portion including: a surface high-resistivity portion provided to cover a surface of the sintered body; and an inner high-resistivity portion extended inward from the surface high-resistivity portion inside the sintered body, and the solution containing silicon is a sodium silicate solution.

10. The method of claim 9, wherein in the sodium silicate solution, a molar ratio of $SiO_2$ to $Na_2O$ is equal to or greater than 23 and equal to or less than 29.

11. The method of claim 9, wherein the solution containing silicon has a viscosity equal to or greater than 1 mPa's and equal to or less than 20 mPa·s at 20° C.

12. The method of claim 9, wherein the second step includes impregnating the sintered body at a reduced pressure equal to or higher than 0.1 kPa and equal to or lower than 50 kPa.

13. The method of claim 9, wherein the third step includes conducting the heat treatment at a temperature equal to or higher than 825° C. and equal to or lower than 900° C.

14. A method for manufacturing a multilayer varistor, the method comprising:

a first step including providing a sintered body including a first internal electrode and a second internal electrode inside;

a second step including impregnating the sintered body with a solution containing a component to form a high-resistivity portion when introduced into the sintered body; and a third step including conducting heat treatment on the sintered body to form the high-resistivity portion in at least part of a surface region of the sintered body, a porosity in the surface region after the third step being smaller than a porosity in a facing region where the first internal electrode and the second internal electrode face each other, the solution being a sodium silicate solution.

15. The method of claim 14, wherein in the sodium silicate solution, a molar ratio of $SiO_2$ to $Na_2O$ is equal to or greater than 23 and equal to or less than 29.

16. The method of claim 14, wherein the porosity in the surface region after the third step is equal to or greater than 0% by volume and less than 2% by volume.

17. The method of claim 14, wherein the porosity in the facing region after the third step is equal to or greater than 2% by volume and less than 6% by volume.

18. The method of claim 14, wherein the porosity of the sintered body in the first step is equal to or greater than 4% by volume and less than 20% by volume.

* * * * *